United States Patent
Waters et al.

(10) Patent No.: US 7,047,924 B1
(45) Date of Patent: May 23, 2006

(54) METHOD FOR DIAGNOSING THE OPERATIONAL STATE OF A TWO-STEP VARIABLE VALVE LIFT DEVICE

(75) Inventors: James P. Waters, Waterford, MI (US); Jon C. Darrow, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/207,364

(22) Filed: Aug. 19, 2005

(51) Int. Cl.
*F01L 1/34* (2006.01)

(52) U.S. Cl. .................. 123/90.16; 123/345; 123/690; 73/117.3

(58) Field of Classification Search ............. 123/90.15, 123/90.16, 90.17, 90.18, 90.27, 90.31, 406.22, 123/406.23, 406.41, 345, 346, 435, 690; 73/116, 117.3; 701/110, 107, 103
See application file for complete search history.

(56) References Cited

U.S. PATENT DOCUMENTS

| | | | |
|---|---|---|---|
| 6,314,375 B1 * | 11/2001 | Sasaki et al. ................. | 702/34 |
| 6,502,536 B1 | 1/2003 | Lee et al. | |
| 6,615,129 B1 | 9/2003 | Kabasin | |
| 6,810,844 B1 | 11/2004 | Sellnau | |
| 6,866,024 B1 | 3/2005 | Rizzoni et al. | |
| 6,877,466 B1 * | 4/2005 | Shindou et al. .......... | 123/90.16 |
| 6,883,478 B1 | 4/2005 | Borraccia et al. | |
| 2005/0204805 A1 | 9/2005 | Wukahara et al. | |

OTHER PUBLICATIONS

Lee, Byungho, et al., Engine Control Using Torque Estimation, SAE Technical Paper Series 2001-01-0995, Reprinted from Electronic Engine Controls 2001: Modeling, Controls, OBD and Neural Networks (SP-1585), Detroit, Michigan, Mar. 5-8, 2001.

\* cited by examiner

*Primary Examiner*—Thomas Denion
*Assistant Examiner*—Ching Chang
(74) *Attorney, Agent, or Firm*—Jimmy L. Funke

(57) ABSTRACT

A method for diagnosing an operational state of a variable valve lift (VVL) device in an engine, wherein the VVL device is capable of operating in two modes of operation. The method includes measuring a rotational speed of an engine crankshaft while the engine is running or cranking, correlating the measured crankshaft speed with an estimated engine cylinder pressure or torque, comparing the estimated engine cylinder pressure or torque with an expected range of engine cylinder pressure or torque values for the two modes of operation for the VVL device, determining if the estimated engine cylinder pressure or torque falls within the expected range of engine cylinder pressure or torque values, and activating an alert if the estimated engine cylinder pressure or torque falls outside the expected range of engine cylinder pressure or torque values to provide notification that the VVL device is operating in an improper mode of operation.

20 Claims, 3 Drawing Sheets

METHOD FOR DIAGNOSING THE OPERATIONAL STATE OF A TWO-STEP VARIABLE VALVE LIFT DEVICE

TECHNICAL FIELD

The present invention relates to a method for diagnosing the operational state of a two-step variable valve lift device; more particularly, to a method that compares existing measured engine parameters with an expected range of parameter values to determine if the two-step variable valve lift device is operating in an improper mode of operation; and most particularly, to a method that compares an estimate of the instantaneous cylinder pressure or torque with an expected range of pressure or torque values to determine if the two-step variable valve lift device is operating in an improper mode of operation.

BACKGROUND OF THE INVENTION

Historically, the performance of an internal combustion engine has been limited by fixed valve lift profiles, i.e., fixed timing of the opening and closing of the valves relative to the angular position of the engine crankshaft and fixed lift of the valves. However, modern internal combustion engines may utilize one of several methods and/or devices to vary the valve lift profile to, at least in part, control the flow of gas and/or air into and/or out of the engine cylinders. Modern internal combustion engines may utilize devices, such as, for example, variable valve actuating mechanisms, two-step cam profile switching mechanisms (i.e., variable valve lift devices (VVL)), and deactivation valve lifters to vary the amount by which the valves of an engine are lifted (i.e., opened). Furthermore, engines may utilize devices, such as variable valve actuating mechanisms and cam phasers, to vary the timing of the opening and/or closing of the engine valves relative to the angular position of the engine crankshaft.

Two-step cam profile switching mechanisms utilize a two-step cam profile switching device, such as, for example, a two-step roller finger follower (RFF), to switch between two discrete valve lift profiles depending at least in part upon engine operating conditions and/or parameters. Two-step systems are relatively simple and are operable over a relatively wide range of engine operating speeds. Further such systems are relatively easy to package on new and even existing engines. By operating the two-step cam profile switching mechanism in conjunction with a cam phaser a wide range of variation in the valve lift characteristic is obtained. The valve lift profile is selected via the two-step cam profile-switching device, and the timing of the valve lift is adjusted and/or varied by the cam phaser.

Currently there are no reliable methods of reliably determining whether one or more of the two-step cam profile switching mechanisms used in an internal combustion engine are in the wrong mode of operation while the engine is cranking and running. One method that currently exists is a hands-on approach, which involves a visual inspection of the two-step cam profile switching mechanism during cranking of the engine, which requires the removal of a substantial portion of the top of engine hardware. A second hands-on approach is a cranking compression test that involves installing a compression tester into each of the spark plug holes, cranking the engine, and measuring the in-cylinder air pressure. Both of the hands-on approaches requires that a person, such as an automobile mechanic, conduct the diagnostic testing and is therefore not a method that is readily applicable to running real-time in an embedded controller.

Another method involves embedding real-time algorithms that use an exhaust oxygen sensor and are therefore ineffective when the engine is not running at stoichiometry. Therefore, the mode of operation of the two-step cam profile switching mechanism could be mis-diagnosed or undiagnosed, which may result in emissions non-compliance or the failure of the two-step cam profile switching mechanism or the engine.

What is needed in the art is a reliable and real-time method for determining whether a two-step variable valve lift device is operating in the improper mode of operation.

It is a principal object of the present invention to provide a reliable and real-time method for determining whether a two-step variable valve lift device is operating in the improper mode of operation.

SUMMARY OF THE INVENTION

Briefly described, the present invention is directed to a method for determining whether a two-step variable valve lift device is operating in the improper mode of operation. In particular, the method is performed in real-time in the embedded engine or powertrain controller and monitors existing engine parameters, such as instantaneous cylinder pressure or torque, using preexisting sensors. The measured engine parameters are then compared with an expected range of predetermined values to determine whether one or more of the two-step cam profile switching mechanisms is operating in an improper mode of operation. If it is determined that one or more of the measured engine parameters fall outside of the expected range of predetermined values, an alert is activated to specify that the two-step variable valve lift device is operating in the improper mode of operation. It will be understood that the method of the present invention may be implemented while the engine is running or cranking.

BRIEF DESCRIPTION OF THE DRAWINGS

The present invention will now be described, by way of example, with reference to the accompanying drawings, in which.

DESCRIPTION OF THE PREFERRED EMBODIMENTS

Generally, as will be described more particularly hereinafter, the method of the present invention is directed to determining whether a two-step variable valve lift device is operating in the improper mode of operation. In particular, the method is performed in real-time in the embedded engine or powertrain controller and monitors existing engine parameters, such as instantaneous cylinder pressure or torque, using preexisting sensors. The measured engine parameters are then compared with an expected range of predetermined values to determine whether one or more of the two-step cam profile switching mechanisms is operating in an improper mode of operation. If it is determined that one or more of the measured engine parameters fall outside of the expected range of predetermined values, an alert is activated to specify that the two-step variable valve lift device is operating in the improper mode of operation.

Figure 1:
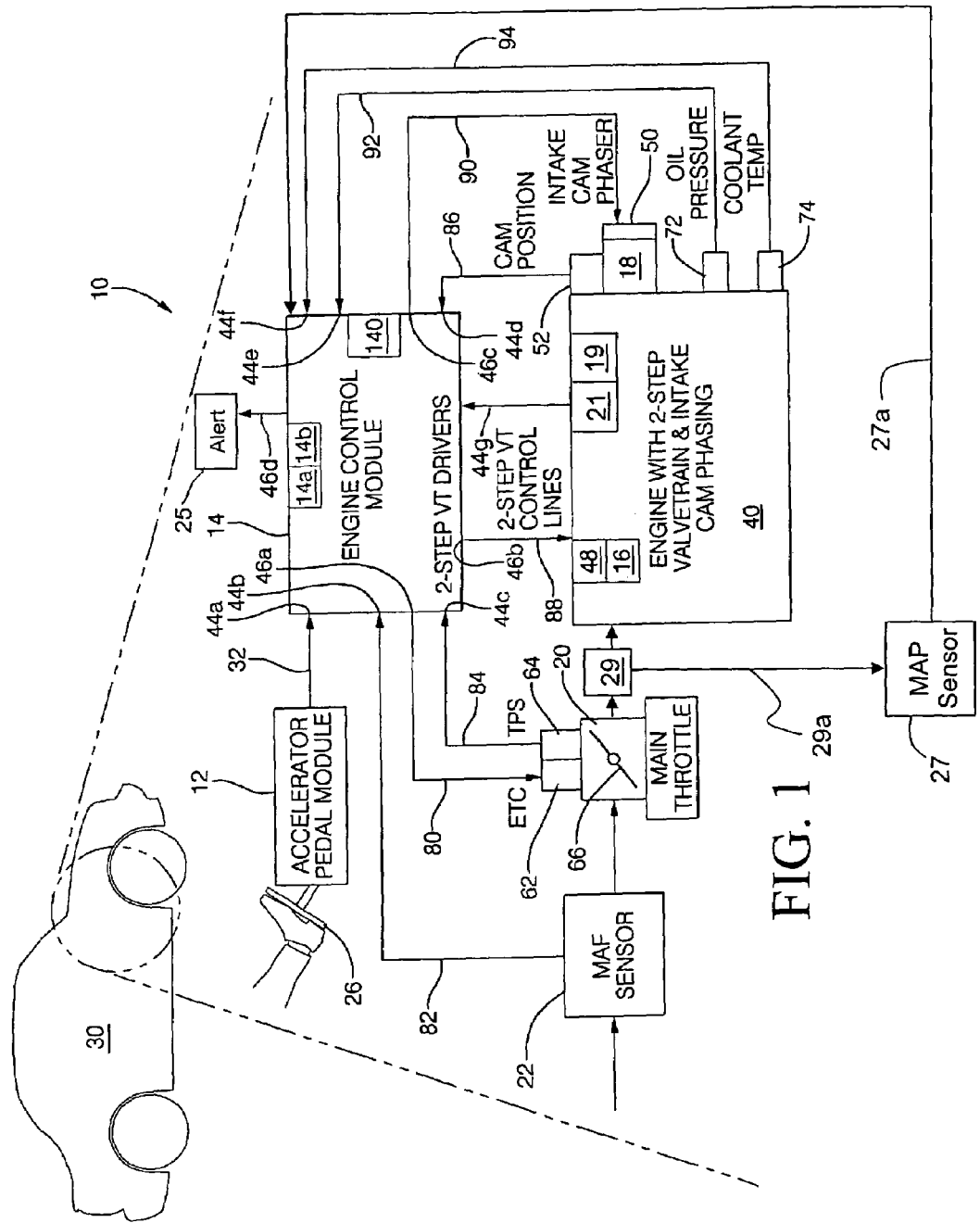
FIG. 1 is a schematic diagram of a system that may be used to implement the method of the present invention, showing an engine control module and an internal combustion engine including a two-step variable valve lift device.

The method of the present invention may be implemented by using a system 10 as shown in FIG. 1. The system 10 includes a pedal module 12, an engine control module (ECM) 14, a two-step variable valve lift device 16, an intake cam phaser 18, an engine crankshaft 19, an electronic throttle control module (ETC) 20, a mass air flow (MAF) sensor 22, and a manifold absolute pressure (MAP) sensor 27.

In particular, pedal module 12 converts the position of a gas pedal 26 of motor vehicle 30 into a desired load command 32, such as, for example, an electrical signal. Desired load command 32 is indicative of the current position, direction of movement, and rate of movement of gas pedal 26, and determines at least in part the load operating conditions of an engine 40. Pedal module 12 is electrically connected with ECM 14, such that ECM 14 receives desired load command 32.

ECM 14 is a conventional engine control module, including, for example, a microprocessor (not shown) interconnected with various interface circuitry, read only memory 14a and random access memory 14b. Control module 14 further includes a plurality of inputs and outputs through which control module 14 receives and transmits data from and to the devices connected thereto. More particularly, control module 14 includes inputs 44a–44g and outputs 46a–d, the functions and interconnections of which will be described in greater detail hereinafter. Pedal module 12 is electrically connected with pedal input 44a, which receives desired load command 32.

Figure 2:
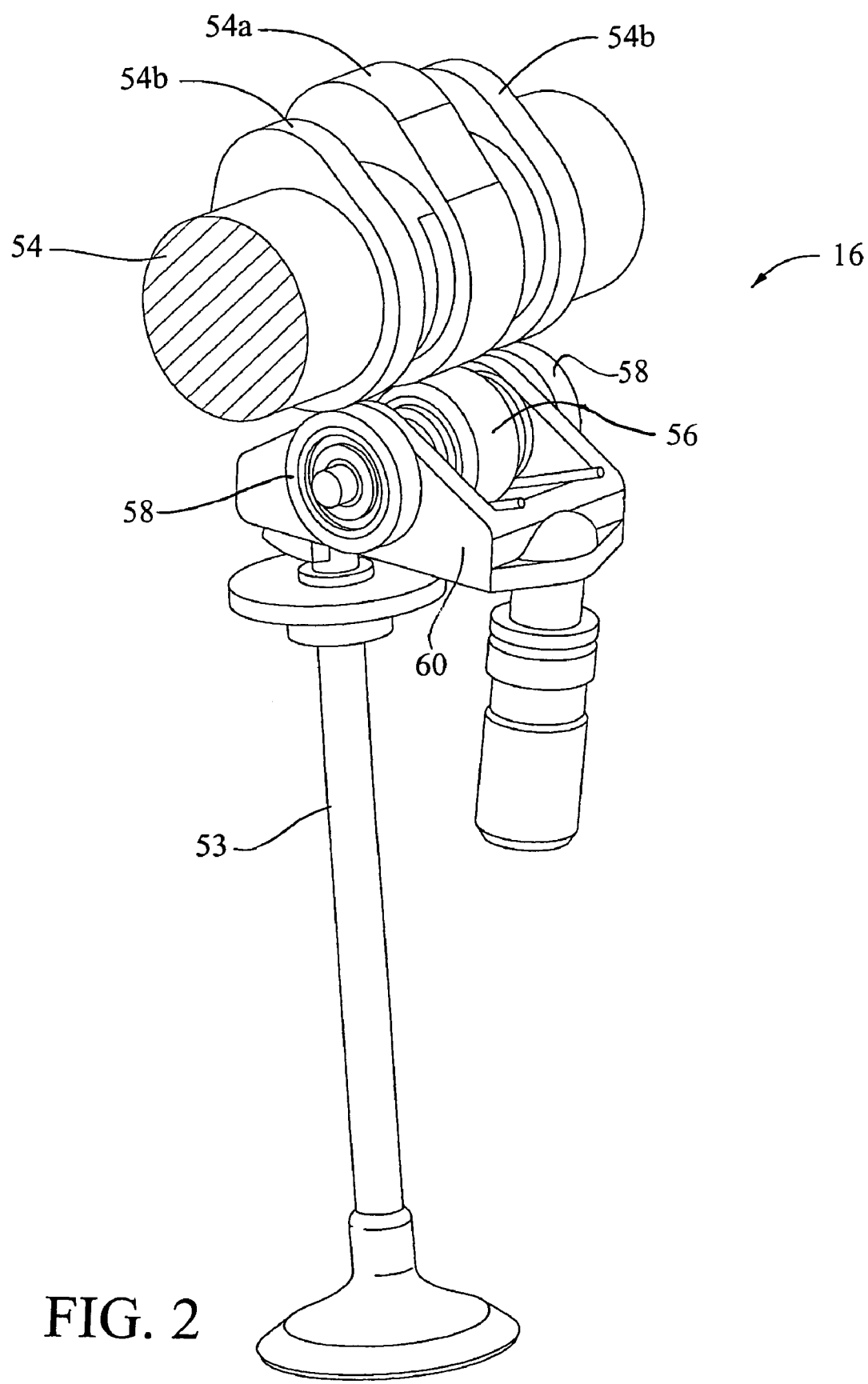
FIG. 2 is a perspective view of the two-step variable valve lift device as installed in the internal combustion engine.

As best seen in FIG. 2, two-step variable valve lift device 16, such as, for example, a two-step roller finger follower as described in commonly-assigned U.S. Pat. No. 6,502,536 to Lee et al. entitled Method and Apparatus for Two-Step Cam Profile Switching, the disclosure of which is incorporated herein by reference, is switchable between a first/high-lift position and a second/low-lift position. With two-step variable valve lift device 16 in the first position, an associated engine valve 53 is actuated, i.e., lifted, according to a high-lift cam 54a of a camshaft 54 of engine 40. Specifically, in the first/high-lift position, a center roller 56 is coupled with a pair of outer rollers 58 so that high-lift cam 54a controls the motion of a body 60 and thereby the lift of valve 53 in accordance with the high lift profile.

With variable valve lift device 16 in the second position, the associated engine valve 53 is actuated/lifted according to a low-lift cam 54b of the camshaft 54.

Specifically, in the second/low-lift position, center roller 56 is not coupled with a pair of outer rollers 58 and is free to move independently of outer rollers 58. As such, the center roller 56 does not control the motion of the body 60 and valve 53. Instead, low-lift cams 54b engage outer rollers 58 and govern the motion of body 60 and thereby operate to lift valve 53 in accordance with the low lift profile.

The high-lift cam 54a and low-lift cam 54b have different lifts, duration and timing configured for improving fuel economy. Also, there may be a factor of 1.5 to 2 of separation between the cylinder pressures for the two modes of operation of the cylinders of an engine including two-step variable valve lift device 16. For sake of clarity, only one two-step variable valve lift device 16 is shown. However, it is to be understood that for each valve 53 of engine 40 there may be an associated and corresponding two-step variable valve lift device 16. Further, it is within the scope of the present invention to use a variable valve device having three or more lift profiles.

Associated with each variable valve lift device 16 is a corresponding two-step actuating device 48, such as, for example, an electronically controlled solenoid, that switches the associated variable valve lift device 16 between high and low lift positions. As stated above, only one two-step switching device is shown for the sake of clarity, and therefore only one two-step actuating device 48 is shown. Each two-step actuating device 48 is electrically interconnected with a respective switching output 46b (only one shown) of ECM 14.

Referring to FIG. 1, intake cam phaser 18 may be a conventional cam phaser as described in commonly-assigned U.S. Pat. No. 6,883,478 to Borraccia et al., entitled Fast-Acting Lock Pin Assembly for a Vane-Type Cam Phaser, which was filed on May 16, 2003, the disclosure of which is incorporated herein by reference. Intake cam phaser 18 enables phasing of the intake cam relative to engine crankshaft 19, i.e., the angular position of the camshaft relative to crankshaft 19 of engine 40. Intake cam phaser 18 thus enables the opening and/or closing of the intake valves of engine 40 to be phased relative to the rotational or angular position of crankshaft 19, thereby phasing the opening and/or closing of the valves relative to piston position. Preferably, intake cam phaser 18 has a wide range of authority, i.e., is capable of phasing the intake cam over a wide range of angles relative to engine crankshaft 19, and is capable of substantially continuous phasing of the intake cam relative to engine crankshaft 19, rather than discrete phasing. Associated with intake cam phaser 18 is phaser actuating device 50 and cam position sensor 52.

Phaser actuating device 50, such as, for example, a fluid control valve or electric motor, is associated with and actuates cam phaser 18. Phaser actuating device 50 is electrically interconnected with phaser control output 46c of ECM 14. Cam position sensor 52, such as, for example, a conventional electrical, optical or electro-mechanical cam position sensor, is associated with cam phaser 18. Cam position sensor 52 is electrically connected to cam position input 44d of ECM 14.

Engine crankshaft 19 is a portion of engine 40 that translates reciprocating linear motion of the pistons within engine 40 into rotational motion. The rotational motion of crankshaft 19 is then transferred through the tramsmission to drive the wheels of the vehicle. Crankshaft 19 typically includes a sprocket having a plurality of teeth formed therein. The speed at which crankshaft 19, and therefore the crank teeth, rotate is dependant upon the frequency at which the pistons are moving within its associated cylinder, which in turn depends on the lift profile (i.e., high lift or low lift) of valve 53. In general, the greater the lift of valve 53, the greater the pressure and torque produced by the associated piston/cylinder, which in turn translates into the crankshaft 19 being rotated at a higher rate. In other words, the lift position of variable valve lift device 16 (i.e., high lift or low lift) affects the pressure or torque produced by the piston/cylinder and the speed that crankshaft 19 and the crank teeth rotate. A crankshaft sensor 21 is electrically connected to cam position input 44g of ECM 14, and operates to transmit information related to crankshaft 19 to ECM 14, such as the instantaneous crank tooth speed from tooth-to-tooth.

Electronic throttle control module (ETC) 20 is a conventional electronic throttle control module, and includes ETC actuating device 62 and throttle position sensor (TPS) 64. ETC 20 further includes a main throttle valve 66 that controls the flow of air into engine 40. ETC actuating device 62, such as, for example, a stepper motor, is electrically connected to throttle control output 46a of ECM 14, and is operable to rotate main throttle valve 66 to a desired position. TPS sensor 64 is a conventional throttle position sensor, which senses the position of throttle valve 66 and is electronically connected throttle position input 44c of ECM 14.

Mass air flow (MAF) sensor 22 is a conventional mass air flow sensor that measures the amount of air flowing through main throttle valve 66. MAF sensor 22 is electrically connected to MAF sensor input 44b of ECM 14.

Manifold absolute pressure (MAP) sensor 27 is a sensor which receives information related to the pressure of the engine's intake manifold 29 via signal 29a and transmits the pressure data to engine control module 14. In particular, MAP sensor 27 sends a signal 27a to engine control module 14, which uses this information to determine engine load conditions so it can adjust spark timing and fuel mixture in engine 40.

In use, ECM 14 receives a plurality of electrical signals at the inputs thereof. More particularly, pedal module 12 is electrically interconnected with input 44a of ECM 14, which receives desired load command 32. Desired load command 32 is indicative of the position, rate of change and direction of change in the position of gas pedal 26. MAF sensor input 44b of ECM 14 is electrically connected to MAF sensor 22, which issues MAF sensor signal 82. MAF sensor signal 82, such as, for example, a pulsed or pulse-width modulated electrical signal, is indicative of the amount or mass of air flowing through main throttle valve 66. MAP sensor 27 sends a signal 27a to engine control module 14 so that the engine load conditions can be determined to allow for the adjustment of the spark timing and fuel mixture in engine 40. Throttle position input 44c of ECM 14 is electrically connected to TPS Sensor 64, which issues TPS sensor signal 84. TPS sensor signal 84, such as, for example, an analog voltage dependent at least in part upon the position of main throttle valve 66. Cam position input 44d of ECM 14 is electrically connected to cam position sensor 52, which issues cam position signal 86.

Cam position signal 86, such as, for example, a digital electrical signal, is indicative of the position of the camshaft (not shown) of engine 40. Inputs 44e and 44f of ECM 14 are electrically connected to oil pressure sensor 72 and coolant temperature sensor 74, respectively, and receive signals 92 and 94, respectively, therefrom corresponding to oil pressure and coolant temperature, respectively. Crankshaft input 44g of ECM 14 is electrically connected to crankshaft sensor 21, which issues a crankshaft signal 23. Crankshaft signal 23, such as, for example, a digital electrical signal or a pulsed or a pulse-width modulated signal, is indicative of the instantaneous crankshaft tooth speed from tooth-to-tooth.

Similarly, ECM 14 issues a plurality of outputs. More particularly, throttle control output 46a of ECM 14 is electrically connected to ETC actuating device 62. ECM 14 issues on output 46a ETC control signal 80, such as, for example, a pulsed or a pulse-width modulated signal, to operate ETC actuating device 62 and thereby position main throttle valve 66 to achieve a desired amount or mass of air flow. As ETC control signal 80 is issued, TPS sensor signal 84 is monitored by ECM 14 to ensure throttle valve 66 is moving in the direction and to the position desired. ECM 14 issues an output 46b two-step actuating device control signal 88, such as, for example, a peak and hold analog voltage, to operate two-step actuating device 48 and thereby place two-step variable valve device 16 into a desired one of the low-lift or high-lift position. Thus, one of the high-lift cam or the low-lift cam is selected, and the desired amount of lift is imparted to the valves of engine 40. ECM 14 may issue an output 46c phaser control signal 90, such as, for example, a pulsed or a pulse-width modulated signal, to operate phaser actuating device 50 and thereby position the cam relative to the crankshaft to achieve a desired phasing of the valves of engine 40. In accordance with the present invention, ECM 14 may also issue an alert signal 46d to enable an alert malfunction indicator light 25 (MAL) when it is determined using the method of the present invention that variable valve lift device 16 is operating in an improper mode of operation.

Generally, ECM 14 is programmed to conjunctively control two-step variable valve lift device 16, cam phaser 18 and ETC 20 to increase fuel efficiency and decrease undesirable emissions relative to an engine having neither, or only one, of a two-step variable valve lift device or a cam phaser. Furthermore, ECM 14 is programmed to conjunctively control those devices to increase fuel efficiency and decrease undesirable emissions relative to an engine incorporating a two-step variable valve lift device and a cam phaser that are not conjunctively controlled in accordance with the present invention. Moreover, ECM 14 is programmed to conjunctively control two-step variable valve lift device 16 and cam phaser 18 to achieve a degree of fuel economy improvement and emissions reduction that approaches the level of improvement achieved in an engine incorporating a more complex continuously variable valve actuating mechanism. Further, ECM 14 is programmed to control ETC module 20, and thereby the position of main throttle valve 66, to achieve and ensure smooth switching between the low-lift and high-lift cam profiles.

Figure 3:
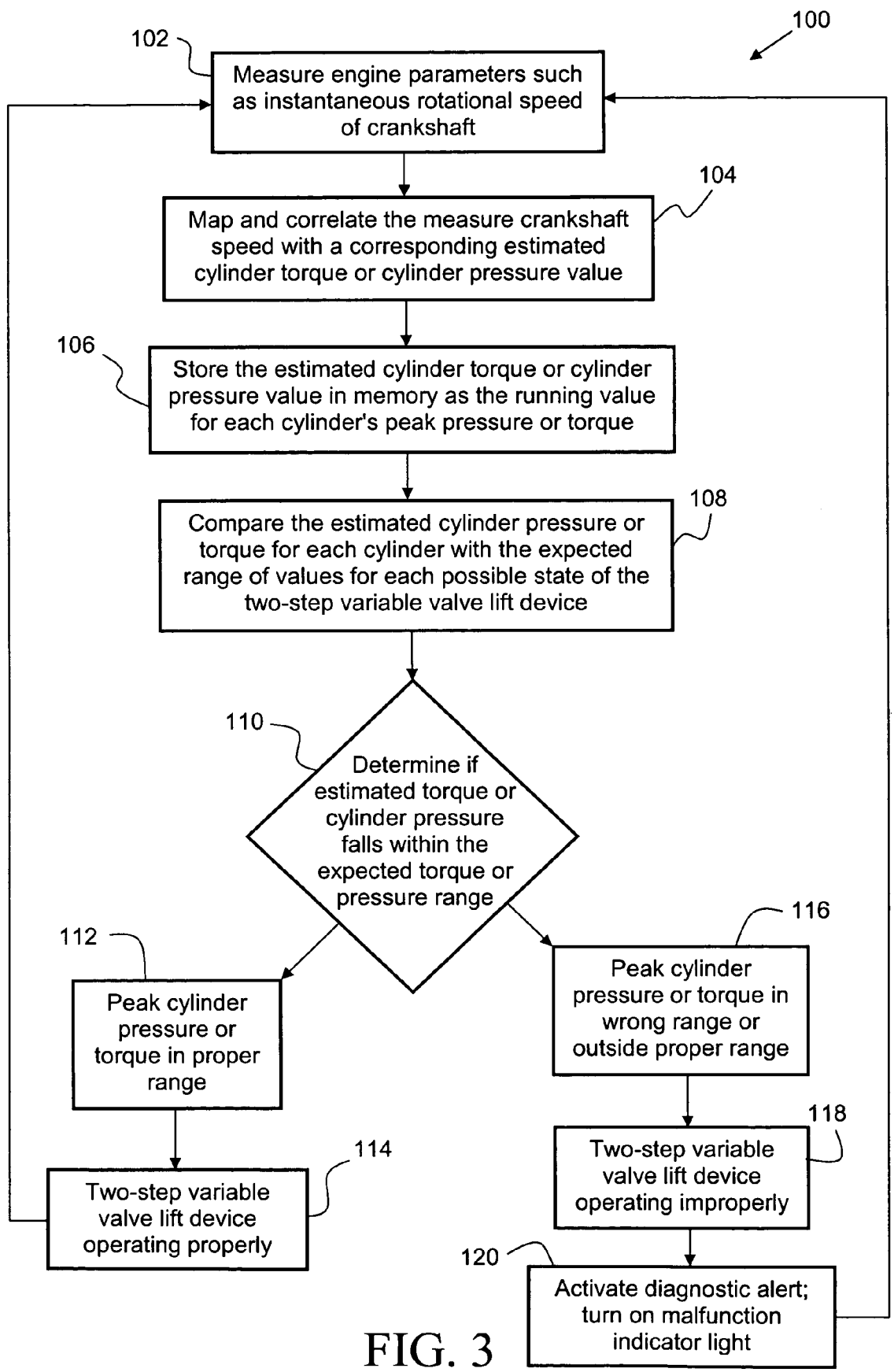
FIG. 3 is a flow chart of one embodiment of the diagnostic method of the present invention.

Referring now to FIG. 3, a flow chart of one embodiment of a method 100 according to the present invention is shown. The method 100 may be accessible to and executed by ECM 14 in accordance with pre-programmed algorithms, execution instructions or sequences, computations, software code modules, interface specifications or the like. It will be understood and appreciated that the method 100 performed by ECM 14 may be implemented in a computing environment such as a personal computer (PC) or other computing device. Such computer may also include a storage device including volatile and nonvolatile, removable and non-removable media implemented in any method or technology for storing information such as program modules, data structures, computer readable instructions, or other data.

The computer storage media may include, but is not limited to, floppy disks, conventional hard disks, read only memory (ROM) 14a, random access memory (RAM) 14b, flash memory, electrically erasable programmable read-only memory (EEPROM), or other types of memory, magnetic cassettes, magnetic tape, magnetic disk storage or other magnetic storage devices, CD-ROM, digital versatile disks (DVD) or other optical disk storage, or any other medium which can be used to store the desired information and which can be accessed by the computer.

ECM 14 may also include communication media for sending and receiving signals, instructions or other parameters from other components in the automotive system, such as gas pedal 26 and throttle position sensor 64. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a direct wired connection, and wireless media such as acoustic, radio frequency, infrared and other wireless media. It will be understood that combinations of any of the above should also be included within the scope of computer readable media.

Generally, the execution of method 100 by ECM 14 consists of one or more steps that run in real-time to monitor existing engine parameters using preexisting sensors to compare the measured values with expected values to determine whether one or more of variable valve lift devices 16 is operating in an improper mode of operation. While it is preferable that method 100 be used on an on-going basis while engine 40 is running, it will also be understood that method 100 may be used during engine cranking.

Specifically, in accordance with the present invention, the method 100 is initiated by measuring certain engine parameters, including the instantaneous rotational speed of crankshaft 19, at step 102. For example, the rotational speed of crankshaft 19 may be obtained by measuring the time interval for adjacent crankshaft teeth to pass by a fixed point on the crankshaft 19. Signals 44g indicative of the speed of the crankshaft are sent to ECM 14 wherein the crankshaft speed may be instantaneously determined in real-time.

At step 104, the measured crankshaft speed may then be mapped and correlated with a corresponding estimated cylinder torque or cylinder pressure value. In particular, the estimated cylinder torque or cylinder pressure may be determined using transfer functions in the time-domain, frequency domain or crank angle domain correlating to the measured crankshaft speed. The preferred method of correlating the crankshaft speed to cylinder torque or cylinder pressure is using the frequency domain analysis shown and described in U.S. Pat. No. 6,866,024 to Rizzoni et al., which is hereby incorporated by reference. Generally, the frequency domain analysis involves mapping the frequency domain component of the energy of several harmonics of the fluctuating crankshaft speed through a correlation table to obtain an estimate of the instantaneous cylinder pressure or cylinder torque value.

Once the estimated cylinder torque or cylinder pressure has been obtained in step 104 for one or more of the engine cylinders, this estimate is stored in memory 14a, 14b in ECM 14 as the estimated torque or pressure for each of the cylinders in step 106. In step 108, the estimated torque or pressure for each of the cylinders is then compared with expected ranges of cylinder pressure or torque for each of the possible states (i.e., high lift and low lift) of the variable valve lift device 16. It will be understood that the expected ranges of cylinder pressure or torque for each of the possible states (i.e., high lift and low lift) of the variable valve lift device 16 may be stored in memory 14a, 14b in the form of look-up tables. In one scenario, the estimated torque or pressure for each of the cylinders may be compared with a single range that includes an upper torque or pressure limit that is associated with the high lift position of variable valve lift device 16, and a lower torque or pressure limit that is associated with the low lift position of variable valve lift device 16.

In another scenario, the estimated torque or pressure for each of the cylinders may be compared with one of two ranges depending on which lift position ECM 14 instructed and expects variable valve lift device 16 to be in. For instance, if the ECM 14 sent a signal 46b to variable valve lift device 16 to be in the high lift position, the estimated torque or pressure for each of the cylinders would be compared with an expected range that includes upper and lower torque or pressure limits associated with the high lift position of variable valve lift device 16. On the other hand, if the ECM 14 sent a signal 46b to variable valve lift device 16 to be in the low lift position, the estimated torque or pressure for each of the cylinders would be compared with an expected range that includes upper and lower torque or pressure limits associated with the low lift position of variable valve lift device 16.

After the estimated torque or pressure for each of the cylinders is compared with the expected torque or pressure range, ECM 14 may then determine if the estimated torque or pressure falls within the expected torque or pressure range at step 110. If the estimated torque or pressure falls in between the expected torque or pressure range at step 112, then it is determined at step 114 that the two-step variable valve lift device is operating in its proper mode of operation (i.e., high or low lift position) and the method 100 proceeds back to step 102. On the other hand, if the estimated torque or pressure falls outside the expected torque or pressure range at step 116, then it is determined at step 118 that the two-step variable valve lift device is operating improperly and a fault counter is initiated. If the fault counter exceeds a predetermined calibrated threshold, then ECM 14 sends alert signal 46d (FIG. 1) to activate malfunction indicator light 25 to provide a notification that variable valve lift device 16 is malfunctioning at step 120, and the method 100 proceeds back to step 102.

The method of the present invention offers numerous advantages over the existing art. For instance, the present method may be implemented in the embedded engine or powertrain controller to monitor existing engine operating parameters using pre-existing sensors located within the engine. This eliminates the need for a hands-on approach wherein the engine must be manually disassembled to visually inspect the two-step variable valve lift device or to conduct tests within the engine compartment, which may be time consuming. In addition, the method of the present invention may be implemented during engine running or engine cranking, thereby providing real-time diagnostics of the operational state of the two-step variable valve device. Furthermore, the method of the present invention provides a more reliable way of determining if the two-step variable valve lift device is malfunctioning.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for diagnosing an operational state of at least one variable valve lift device in an engine, the variable valve lift device capable of operating in at least two modes of operation, the method comprising:
    measuring an engine parameter while the engine is running or cranking;
    correlating the measured engine parameter with an estimated engine cylinder pressure;
    comparing the estimated engine cylinder pressure with an expected range of engine cylinder pressure values for the at least two modes of operation for the variable valve lift device;
    determining if the estimated engine cylinder pressure falls within the expected range of engine cylinder pressure values; and activating an alert if the estimated engine cylinder pressure falls outside the expected range of engine cylinder pressure values to provide notification that the variable valve lift device is operating in an improper mode of operation.

2. A method in accordance with claim 1 further comprising storing the estimated engine cylinder pressure in memory.

3. A method in accordance with claim 2 wherein the memory is located within an engine control module.

4. A method in accordance with claim 1 wherein the engine parameter is the rotational speed of an engine crankshaft.

5. A method in accordance with claim 1 wherein the correlation of the measured engine parameter with the estimated engine cylinder pressure is performed using a frequency domain analysis.

6. A method in accordance with claim 1 wherein the expected range of engine cylinder pressure values is associated with one of the modes of operation for the variable valve lift device.

7. A method in accordance with claim 1 wherein the expected range of engine cylinder pressure values is associated with at least two of the modes of operation for the variable valve lift device.

8. A method for diagnosing an operational state of at least one variable valve lift device in an engine, the variable valve lift device capable of operating in at least two modes of operation, the method comprising:
    measuring an engine parameter while the engine is running or cranking;
    correlating the measured engine parameter with an estimated engine cylinder torque;
    comparing the estimated engine cylinder torque with an expected range of engine cylinder torque values for the at least two modes of operation for the variable valve lift device;
    determining if the estimated engine cylinder torque falls within the expected range of engine cylinder torque values; and
    activating an alert if the estimated engine cylinder torque falls outside the expected range of engine cylinder torque values to provide notification that the variable valve lift device is operating in an improper mode of operation.

9. A method in accordance with claim 8 further comprising storing the estimated engine cylinder torque in memory.

10. A method in accordance with claim 9 wherein the memory is located within an engine control module.

11. A method in accordance with claim 8 wherein the engine parameter is the rotational speed of an engine crankshaft.

12. A method in accordance with claim 8 wherein the correlation of the measured engine parameter with the estimated engine cylinder torque is performed using a frequency domain analysis.

13. A method in accordance with claim 8 wherein the expected range of engine cylinder torque values is associated with one of the modes of operation for the variable valve lift device.

14. A method in accordance with claim 8 wherein the expected range of engine cylinder torque values is associated with at least two of the modes of operation for the variable valve lift device.

15. A system for diagnosing an operational state of at least one variable valve lift device in an engine, the variable valve lift device capable of operating in at least two modes of operation, the system comprising:
    an engine crankshaft positioned within the engine;
    a crankshaft sensor for measuring the rotational speed of the engine crankshaft;
    piston and cylinder assembly located within the engine and operably coupled with the engine crankshaft; and
    an alert mechanism,
    wherein the measured rotational speed of the crankshaft is correlated with an estimated engine cylinder pressure or torque, wherein the estimated engine cylinder pressure or torque is compared with an expected range of engine cylinder pressure or torque values for the at least two modes of operation for the variable valve lift device, and wherein the alert mechanism is activated if the estimated engine cylinder pressure or torque falls outside the expected range of engine cylinder pressure or torque values to provide notification that the variable valve lift device is operating in an improper mode of operation.

16. A system in accordance with claim 15 further comprising an engine control module including a memory for storing the estimated engine cylinder pressure or torque.

17. A system in accordance with claim 15 wherein the correlation of the measured engine parameter with the estimated engine cylinder pressure is performed using a frequency domain analysis.

18. A system in accordance with claim 15 wherein the expected range of engine cylinder pressure or torque values is associated with one of the modes of operation for the variable valve lift device.

19. A method in accordance with claim 15 wherein the expected range of engine cylinder pressure values is associated with at least two of the modes of operation for the variable valve lift device.

20. A computer-readable medium having computer-executable instructions for performing a method for diagnosing an operational state of at least one variable valve lift device in an engine, the variable valve lift device capable of operating in at least two modes of operation, the method comprising:
    measuring an engine parameter while the engine is running or cranking;
    correlating the measured engine parameter with an estimated engine cylinder pressure or torque;
    comparing the estimated engine cylinder pressure or torque with an expected range of engine cylinder pressure or torque values for the at least two modes of operation for the variable valve lift device;
    determining if the estimated engine cylinder pressure or torque falls within the expected range of engine cylinder pressure or torque values; and
    activating an alert if the estimated engine cylinder pressure or torque falls outside the expected range of engine cylinder pressure or torque values to provide notification that the variable valve lift device is operating in an improper mode of operation.

* * * * *